United States Patent Office 2,993,523
Patented July 25, 1961

2,993,523
PROCESS AND APPARATUS FOR CONTINUOUS PRODUCTION OF FLAT LAMINATES
Ugo Monaco, Castellanza, and Arturo Werthhammer, Busto Arsizio, Italy, assignors to Montecatini Società Generale per l'Industria Mineraria e Chimica, Milan, Italy, a corporation of Italy
Filed Oct. 15, 1957, Ser. No. 690,334
Claims priority, application Italy July 18, 1956
13 Claims. (Cl. 154—1)

This application is in part a continuation of our prior application Serial No. 672,385, filed July 17, 1957, subsequently abandoned.

This invention relates to a machine and to a process for the continuous production of flat laminates, particularly consisting of polyester resin and paper.

The continuous preparation of flat, or stratified, laminates by impregnation of paper, fabrics or other fibrous sheets with phenol-formaldehyde, or urea-formaldehyde resins, and the like, requires high pressures, at hundreds of kgs. per cm.$^2$, in order to assure the complete homogeneity of the product. The use of said resins requires complex, heavy, and expensive apparatus. In addition, these processes are not carried out continuously.

Recently, for this purpose, polyester resins have come into use which have the advantage that one can operate at markedly lower pressures; that is, at a contact pressure of about 1 kg./cm.$^2$ or less, advantage being taken of the fact that, during the polymerization, these resins develop practically no volatile product. The apparatus required is simpler and the product, that is, the laminate, is, therefore, more economical. It is also feasible to realize the continuous production of laminates.

For this purpose, flexible, impermeable and heat resistant sheets are used which sandwich both faces of the impregnated fibrous sheets and prevent escape of the resin from the impregnated layer. Cellophane, cellulose acetate and polyvinyl alcohol sheets are employed for this. Said flexible sheets may be drawn by suitable drawing devices, and in this state the laminate may be polymerized. This method, however, would not permit careful control of the tension of the covering sheets, and a pressure normal to the laminate is not obtained therein.

An object of the present invention is a machine comprising a moving endless metal belt supported on a track or on nearby rolls. The working part of the belt is an arcuate surface, by means of which it is possible to obtain a uniformity in the polymerization pressure otherwise obtainable only by press molding.

Before it enters the polymerization chamber, the various sheets which form the laminate are introduced, together with two cellophane sheets, between two squeeze rolls. The resin impregnated laminate then passes against or over the arcuate part of the belt, which is contained in the polymerization chamber.

During its run against or over the convex surface of the belt, the laminate is subjected to a pressure perpendicular to said surface, owing to the drawing action.

A function of the moving metal belt, or belts, is to eliminate the relative movement and therefore the friction between the laminate and the arcuated support, in order to obtain uniform pressure on the part of the laminate that runs on the convex surface of the endless belt. The uniform pressure exerted against the laminate assures complete homogeneity of the same product. The curved belts move in the same direction, and at the same speed, as the adjacent laminate.

Another object of the present invention is to provide a continuous process characterized in that the various paper sheets forming the laminate are impregnated in a separate stage of the process, by passing them through a tank filled with a polyester resin. The resin has a low viscosity in order to allow the use of markedly thick sheets. Benzoyl peroxide is used as catalyst. This catalyst is known as warm catalyst, since it requires heating for the polymerization reaction. The impregnation methods heretofore used cannot be employed here, because the thickness of the sheets and their relatively quick passage through the resin do not permit satisfactory impregnation. Thicker sheets result in easier working of the machine.

The passage of the individual sheets into the tank serves to distribute onto the paper the needed amount of resin, with a slight excess. The paper is wound up again, and the roll is stored for at least 12 hours, in order to obtain complete impregnation before the use. During the storage the roll is maintained in slow rotation in order to avoid its deformation.

Another object of the present invention is to produce flat laminates without using the above-mentioned flexible covering sheets, by forming the laminate in direct contact with the metal belt, thereby obtaining a better surface finishing than that obtained with said flexible sheets.

Still another object of the invention is to provide temperature control means and other devices to improve the appearance and physical characteristics of the laminate, and to make these properties constant, reproducible, and stable.

The accompanying drawings illustrate various embodiments of the machine employed for the practical realization of the process of the present invention.

FIGS. 1 to 3 illustrate, schematically, three types of moving belt apparatuses, in vertical sections taken perpendicular to the rotational axis.

FIGS. 9, 10, 11 are schematic views in side elevation of the left, middle, and right regions of the machine of FIG. 8;

Figure 1:
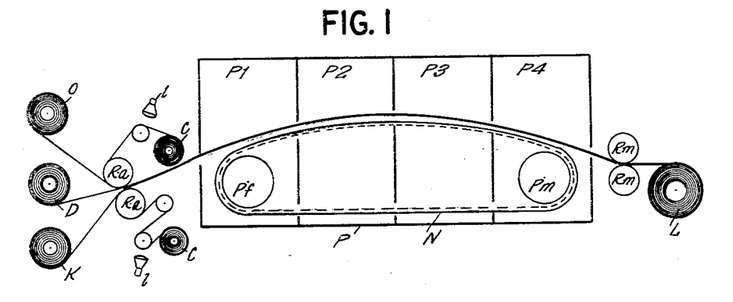
FIG. 1 illustrates a single endless belt having one arcuate section.

Referring to FIG. 1 of the drawing, the laminate usually consists of one or more sheets of kraft paper (K), which form the body of and impart resistance strength to the laminate, above which there is a sheet of decorated paper (D) having pigments added, so that, when it is wet by the resin, the kraft paper does not appear through. Sheet D is printed with the desired decorative subjects. Upon this decorative sheet there is a sheet of surface paper, an overlay O, which becomes transparent when it is impregnated and serves to protect the underlaying decorative sheet against wear. The paper sheets are previously impregnated as described above.

On the laminating machine the impregnated paper rolls O, D, K are mounted on shafts equipped with suitable friction brakes. The various sheets are brought together, between two combining and drawing rolls Ra, Ra, with two outer flexible protective sheets of cellophane supplied from rolls C, C. These rolls are also provided with suitable brakes. The consequent tensile defects in the cellophane are corrected by means of infrared lamps 1. the two combining rolls Ra, Ra are provided with a mechanism (not shown in the figure) for sensitive regulation of their relative distance, in order to control the thickness of the laminate.

Between the various sheets advancing to the rolls a layer of polyester resin, having a very high viscosity, such as 10,000 to 100,000 centipoises, is maintained, in order to obtain good adhesion, free of voids, among the sheets. The assembly thus formed passes into the polymerization chamber P in which it travels over the convex surface of the moving endless belt N carried by two pulleys Pm, Pf. Pm is power driven and Pf is idle, so that the drawing action of power driven rolls Rm, Rm assures uniform pressure perpendicularly to the laminate.

The polymerization chamber P is divided into 4 sections $P_1$, $P_2$, $P_3$, $P_4$, the first of which, $P_1$, has the function of preheating and is kept at about 80° C. by air heating, the second and the third, $P_2$, $P_3$, being the real polymerization sections kept at 85–90° C. In these two sections the thermal control must be closer, owing to the exothermic nature of the reaction. The temperature of the last section $P_4$, employed for after-curing, is about 100° C. Any conventional heating means may be employed, such as heating jackets about the sections.

The laminate remains in the polymerization chamber for a total time of 10 to 20 minutes. The cured laminate is drawn from the two power rolls Rm, Rm and wound up on a bobbin L. A mechanical connection (not shown in the figure) between Ra, Ra and Rm, Rm permits control of the tension of the laminate on the arcuate run, while a mechanical connection (not shown) between Rm, Rm and Pm permits the decreasing of relative movement between metal belt N and the laminate to zero.

The said mechanical connections may comprise a common drive shaft having speed ratio control gears or belts or pulleys transmitting motion from the shaft to each of the driven rolls or pulleys.

The convex portion of belt N is supported between upper and lower flanges (not shown) carried by the opposite walls of the polymerization vessel. The flexible belt has transverse ribs (not shown) the ends of which slide between the flanges. Alternatively, the convex portion of belt N is supported upon or against stationary transverse ribs or a stationary perforated convex member (not shown) fixed to the walls of the polymerization vessel.

The product thus obtained is a laminate which is particularly suitable for decorative uses. It has a markedly lower cost than a melamine laminate produced with a press under a high specific pressure.

Figure 2:
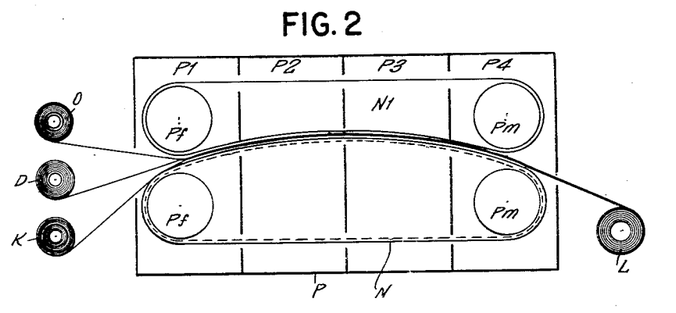
FIG. 2 shows two endless belts having opposed arcuate sections.
Figure 2:
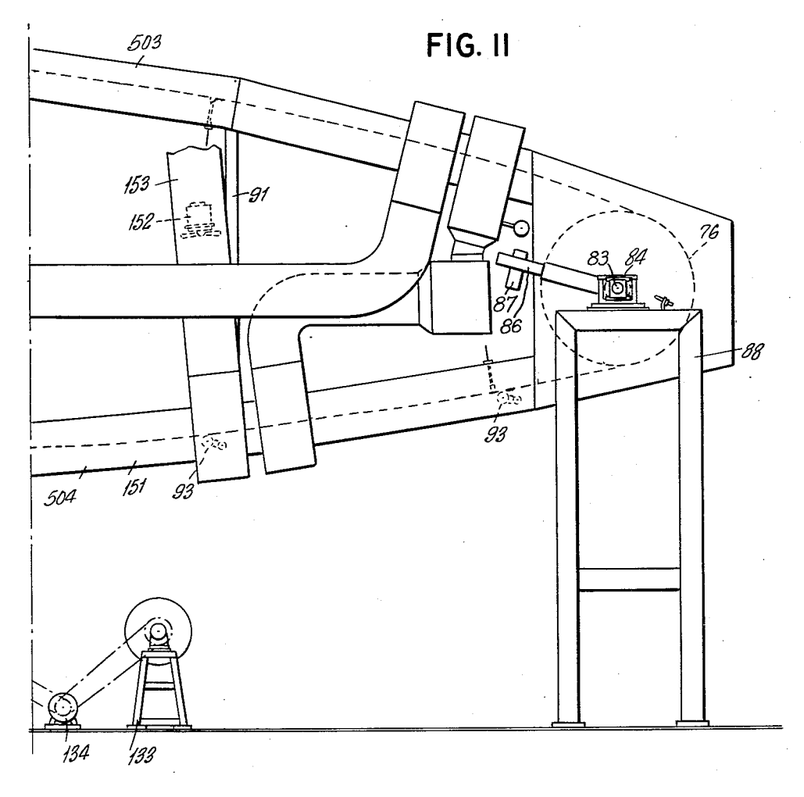

Referring to the embodiment described in FIG. 2, in order to further increase the pressure on the laminate during the polymerization a second endless flexible moving metal belt $N^1$, kept under tension, has been applied to the arcuate surface of belt N. Both belts run in the same direction and preferably at the same peripheral speed as the laminate.

In FIG. 2 the laminate passes between the two moving surfaces. Combining rolls and drawing rolls are thereby eliminated, and cellophane covering sheets are not required, being replaced by the smooth surfaces of the two belts. The use of this second metal belt, placed over the laminate, permits a marked increase in the contact pressure at which the laminate is polymerized.

Figure 3:
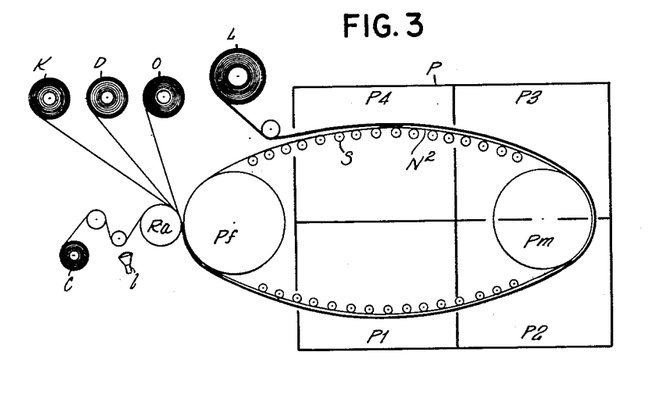
FIG. 3 describes an endless belt apparatus having two opposite arcuate laminate bearing surfaces.

FIG. 3 illustrates another variation of the machine of FIG. 1, in which only one endless flexible, moving metal belt $N^2$ is employed. The belt has opposite convex surfaces supported on stationary transverse rods or screen S. In this embodiment one or both cellophane covering sheets are eliminated, and the drawing rolls are also removed. There is present only a combining roll Ra, which operates against moving surface $N^2$. One outer cellophane sheet is shown at C.

It is understood that the apparatus described above may be further modified in respects obvious to persons skilled in the art. For example, the two outer sheets C and the feeding and tensioning rollers Ra and Rm of FIG. 1 may also be employed in FIGS. 2 and 3.

Figure 4:
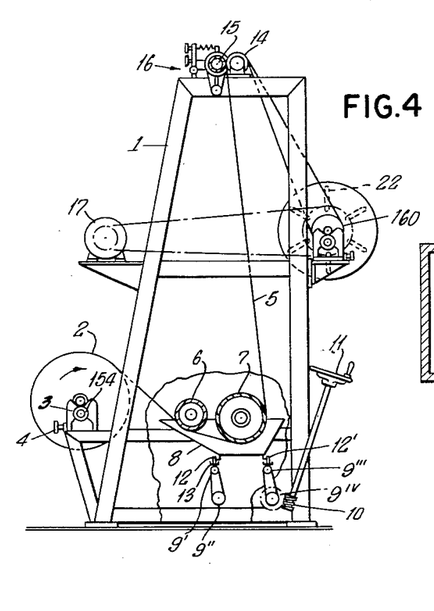
FIG. 4 is a side view and FIG. 5 is a front view of the impregnation device.
Figure 5:
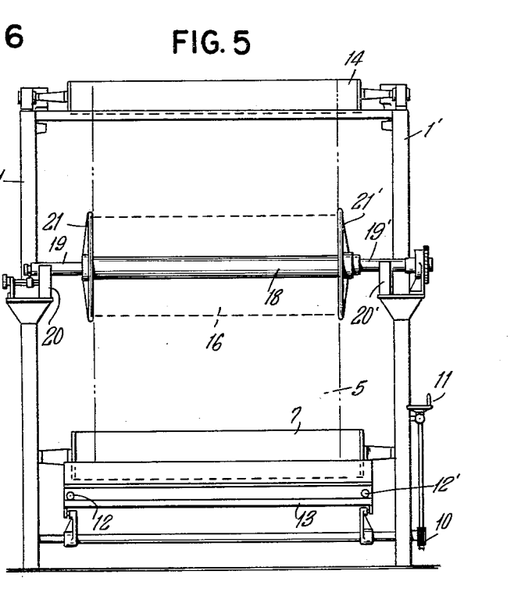

The device illustrated in FIGS. 4 and 5 serves to distribute onto the paper sheets the desired amount of fluid type low viscosity polyester resin, having a viscosity range of 500–1000 centipoises, polymerized with warm catalysts. This device comprises a framework 1, 1' which carries, on suitable brackets, the paper roll 2 being unwound. This paper roll is mounted on an axis which is provided with fixing or supporting cones of a type commonly used in the paper industry, and is supported by roll bearings 3. It is suitably braked by means not shown in the figure but is similar to that indicated in FIG. 12 at 68. One of the bearings 3 can be moved longitudinally by means of screw 4, so that close parallelism with the other axis of the device can be obtained, while by means of screw 154 the paper roll can be moved transversely.

Paper sheet 5, upon unwinding from the roll, passes under rollers 6 and 7 which are partially immersed in the resin contained in the tank 8. This tank is mounted on an articulated parallelogram, the articulated joints 9', 9'', 9''' and 9'''' of which are controlled by endless screw 10 which, in turn, is operated by handwheel 11. In this way the tank 8 can be lowered below the rollers 6 and 7 so that it may be withdrawn sideways, its wheels 12, 12' running on track 13.

Figure 6:
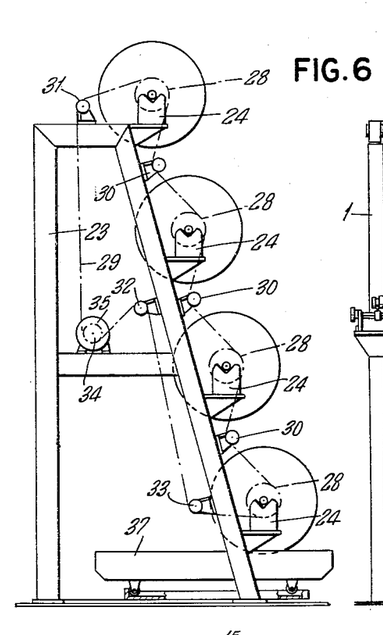
FIG. 6 is a side view and FIG. 7 a front view of the bobbin storage device.
Figure 7:
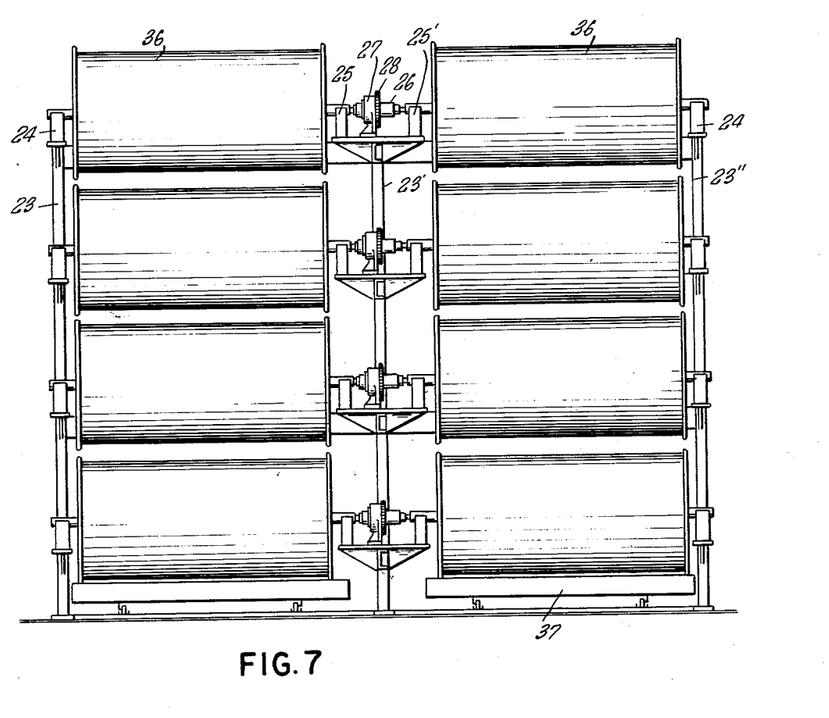

Paper sheet 5, leaving tank 8, moves upwards substantially vertically for about 2 meters until it passes between a pair of squeeze rollers 14, 15. Roller 14 is fixed, roller 15 being adjustable in respect to its distance from the other by means of micrometric screws 16. In this way the resin excess is forced back and returns to tank 8. The excess slides along the rising paper, which thus provides, in effect, prolongation of tank 8. The paper sheet leaves rollers 14 and 15 with the exact amount of resin needed for its impregnation. The impregnation, particularly in the case of heavy or of highly charged papers, is not completed during the run of the paper in this machine. However, it can be completed during the standing period on the device that follows, which is illustrated in FIGS. 6 and 7. The paper, leaving rollers 14 and 15 must therefore possess on its surface an excess of resin which is subsequently absorbed.

The sheet which leaves rollers 14 and 15 moves downwardly and is wound up on metal bobbin 160 which, through a suitable drive, is actuated by direct current motor 17 having a variable speed and a constant torque. By means of this motor the tension of the paper sheet can be regulated as desired. The speed of the paper in this device varies from 30–50 meters per hour, when thin overlay papers are impregnated, to 20–30 meters per hour, when heavy or more highly charged papers are impregnated, such as kraft or decorative papers.

Winding bobbin 160 consists of a core with two pins 19 and 19' (FIG. 5) mounted on supports 20, 20', similar to the previously mentioned bearing supports 3. One of the supports is similarly provided with transverse and longitudinal adjusting means.

Core 18 carries at its ends two containing flanges, flange 21 being fixed and 21' removable. The inside faces of these flanges carry radial grooves 22 (FIG. 4), to permit the escape of excess resin, which is pressed out during the winding up of the impregnated paper.

As mentioned above, the paper wound up on the bobbins of the impregnating machine carries the required amount of resin distributed on its surface but, in order that the resin may penetrate through the thickness of the sheet, a period of time is required which can amount to several hours for the heaviest paper. The employment of the paper rolls in the laminating machine (FIG. 8) must therefore be delayed for the same time. In practice it has been found that it is convenient to use the paper rolls a day after the impregnation.

In this interval the paper rolls must be kept in slow rotation in order to avoid their deformation due to their weight, or to avoid a loss of resin. For this purpose they are placed in the device illustrated in FIG. 6 in side elevation and in FIG. 7 in front elevation. This device consists of a treble framework 23, 23' and 23". Side frameworks 23 and 23" carry, on suitable brackets, roll bearings 24 of the type already described. Central framework 23' carries the same number of brackets and on each bracket a number or pair of bearings 25 and 25' of the same type and, between the two bearings a short shaft 26, supported by 27, which on its center carries a sprocket wheel 28. A roller chain 29 engages all of the sprocket wheels 28, and also driving gears 30, 31, 32, 33 and sprocket wheel 34 carried by speed reducer 35. By this mechanism all shafts 26 are kept in slow rotation, for example, at 1 r.p.m. Each shaft 26 is provided at each end with a square slot, which is not visible in the figure, in which the corresponding square ends of shafts of bobbins 36 are engaged, which are thus rotated. Tank 37 collects the resin that eventually drips down.

The laminating machine, illustrated in FIGS. 8 to 15, employs the impregnated paper rolls, produced in the impregnation device, for the production of the article to be manufactured. The latter consists of an assembly of the sheets bound indissolvably by polymerized resin, and presenting at least one perfectly smooth surface, free of pores, wrinkles, etc., which can exhibit any desired drawing and is suitable for lining furniture, walls, and other articles and structures.

For this purpose the paper rolls 38, 39, 40, 41, 42 (FIGS. 8 and 9), removed from the storing device of FIGS. 3 and 4, are placed, in the desired number and succession, in the supports 43 (FIG. 9) and 43' (FIG. 12) of the type already described, carried by framework 44, 44'. On the same framework 44 there are two supports 45 which carry two cellophane rolls. These comprise the upper roll 46 and lower roll 47 (FIG. 9), these rolls being 10-20 cm. wider than the paper roll.

Figure 12:
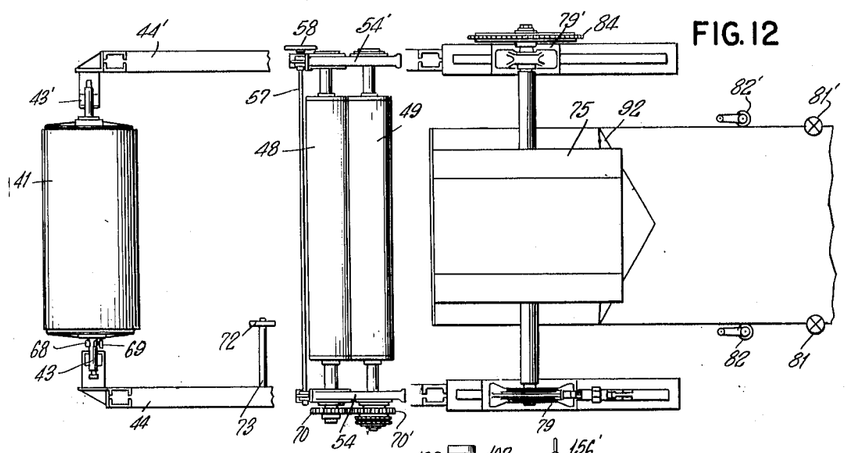
FIGS. 12 and 13 are partial plan views of the laminating machine of FIG. 8.

In FIG. 12, only one paper roll 41 is indicated for the sake of clarity and, for the same reason, other elements which will be described hereinbelow are not shown. All the rolls are braked by means of shoe brakes 68 which act on the respective shafts. The braking action can be regulated by the screws 69 which enable the shoes to be tightened adjustably.

Usually roll 38 (FIGS. 8 and 9) is of thin paper of pure cellulose, which functions as overlay, becoming transparent when impregnated with resin. It forms the protective layer for the lower decorative layer supplied by roll 39.

Rolls 40, 41, 42 (FIGS. 8 and 9) are usually of kraft paper, which forms the body of the laminate. One or more rolls of this type are employed, depending on the thickness of the kraft paper used and on the desired thickness of the finished laminate.

Leaving the rolls 39 and 42, the paper sheets pass directly between two ground steel rollers 48, 49 which have a marked rigidity. This occurs while the two cellophane sheets, which unwind from rolls 46 and 47, pass first over guide rollers 50, 51 (FIG. 9) which permit better stretching, and then cover the rollers 48 and 49 over a substantial area in order to further improve the stretching. Two banks of infrared lamps 52, 52 are directed onto the zones of the cellophane sheet which appear to be slackened, to promote local shrinkage.

In addition to the papers and cellophane sheets, there is employed a narrow paper tape 71, carrying a graduation in meters and decimeters, and of a type known in the textile industry, which serves also for the successive operations of control and division of the laminate. Tape 71 is passed between rollers 48 and 49 and is placed along one end of the paper sheets, thus forming a kind of selvage. It unwinds from roll 72 journaled by support 73 (FIG. 12).

Rollers 48 and 49 are supported by two shoulders 54 and 54' (FIG. 12), placed on brackets 55 (FIG. 6) of framework 44.

Brackets 55 present a supporting place for the shoulders or posts 54, 54' which slope so that the plane containing the axis of the two rollers is perpendicular to the plane of the assembly of the combined sheets which leave this combining device. This is done in order to avoid tension and slackening among the various sheets.

The distance between the rollers 48 and 49 is regulated by means of two screws which raise or lower, as desired, the supports of the upper roller 49. The action on the two supports is contemporaneous owing to the endless screw mechanisms 56, 56', operated by the same shaft 57 when hand wheel 58 is actuated. The distance between the rollers 48 and 49 is read by means of centesimal comparators which are not visible in the figures.

Roller 49 is actuated through chain gearing 65 by the direct current speed reducer 66 by means of which, operating a suitable rheostat placed in the control panel 67 (FIG. 14), the roller can be rotated at any angular velocity, corresponding to an advancing speed of the laminate included between 0 and 70-80 m. per hour. Roller 48 is actuated by roller 49 by means of the gear couple 70, 70' (FIG. 12).

Onto the paper sheets leaving the rolls 38 and 42, a small amount of warm catalyzed polyester resin having a high viscosity, from 10,000 to 100,000 centipoises, must be distributed before their joining, in order to obtain good adhesion between the sheets. To accomplish this, the viscous resin is placed in tank 59 (FIG. 9), from which pump 60, of the type generally used for pressure lubrication, pushes it into pipe 61 connected with bored pipes 62, from which the resin drops onto the sheets. The resin accumulates in the form of regular beads between each pair of plies, before rollers 48, 49. The excess of resin flows outside the edges of the sheets into chute 63, which leads it again into tank 59. In order to prevent the excess of resin from spreading outside the edges of cellophane, two air jets, not shown in the drawing, are placed at the ends of the coupling zone of the sheets to push continuously the excess of resin towards the center of the machine.

From between rollers 48 and 49, and perpendicularly to the axes of the same, there issues an ensemble 64, consisting of the impregnated paper sheets enclosed between the two air excluding cellophane films.

Figure 9:
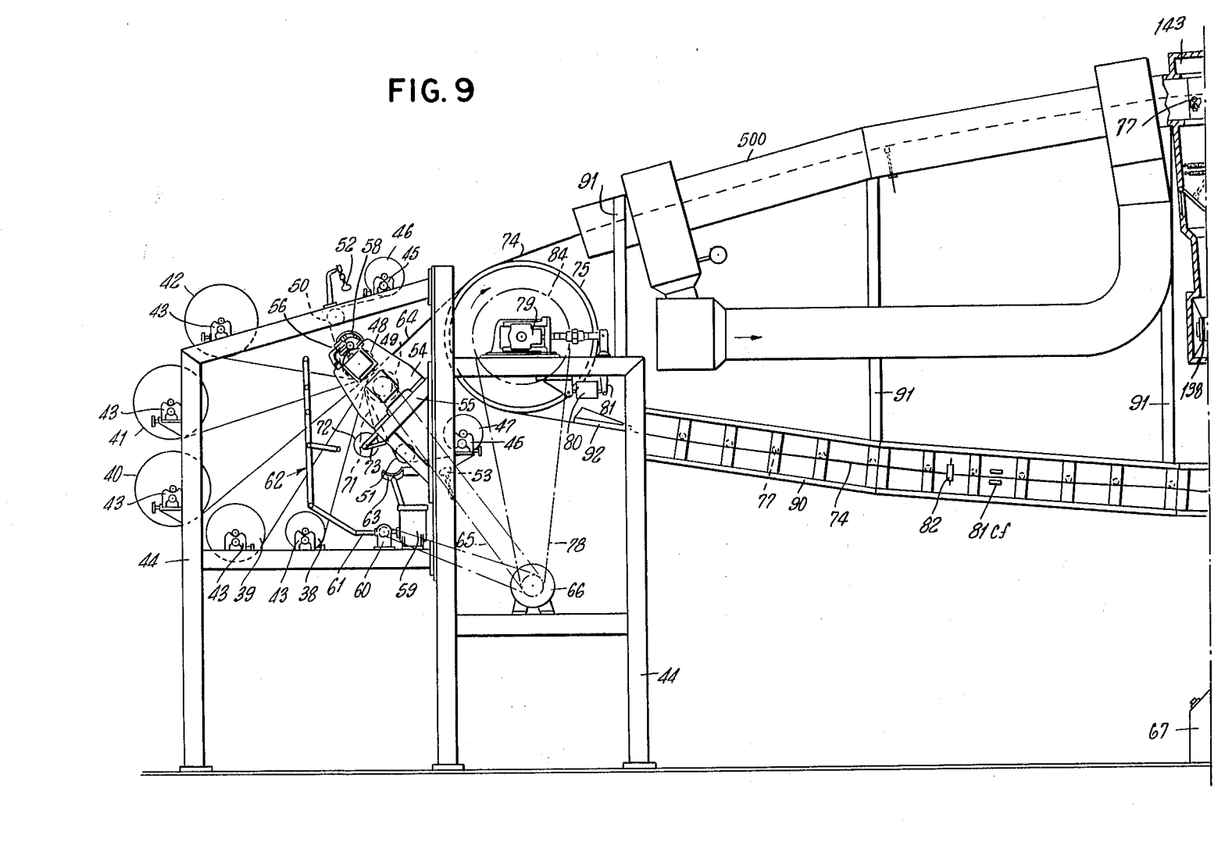

This impregnated assembly 64 passes over the endless belt 74 (FIG. 9) whose width is 1-2 cm. less than that of the paper sheets which form the impregnated assembly 64. Belt 74 consists of an endless plate, preferably a stainless steel plate. This belt is supported by two drums 75 and 76 and the intermediate transverse supports 77, only some of which are shown in FIG. 9, so that it assumes an oval configuration. In this respect belt 74 is similar to the oval belt shown in FIG. 3.

Drum 75 is actuated, by the same motor 66 which actuates the pair of combining rollers 48 and 49, through chain 78 and sprocket 84, so that the advancing speed of the belt is the same as the impregnated assembly supported thereon. This is variable from 0 to 70-80 m. per hour. Since the laminate must remain in the heated zone of the machine, the length of which is about ⅔ that of belt 74, for 15-20 minutes, the length of the belt must be at least 30 m. In this system in which there is no relative movement between the metal belt 74 and the impregnated laminate 64, the mechanical and thermal disadvantages encountered in the laminating machines in which the impregnated laminate passes over a fixed arcuated surface are avoided. In fact, the relative movement in the latter causes scoring in the laminate. Also, due to the friction, the tension applied to the laminate decreases from the outlet to the inlet of the machine, so that in order to have a sufficient tension on the impregnated laminates which leaves the cylinders 48, 49 an excessive tension must be applied to the cured laminate which leaves the machine. Moreover, in the case of the fixed arcuated surface, if overheating occurs due, for example, to too quick release of heat of polymerization in a zone of the laminate, during the polymerization of the resin, this overheating is transmitted to the lower zone of the fixed arc over which other portions of the laminate are passing. The excessive temperature of the arc causes again an overheating in these portions of the laminate. It is evident that in this way the overheating with the formation of blisters, etc., propagates over long portions of the laminate. This is in contrast to the mobile belt constructed according to the present invention, in which the overheating zone advances with the laminate and cannot propagate.

Left drum 75 (FIGS. 9 and 12) rotates on two supports 79, 79'. The servomotor 80, acting through arm 81, can move the support 79 longitudinally. Servomotor 80 is operated, through suitable electric devices contained in the panel 67, by a pair of photoelectric cells 81' only one of which is visible in FIG. 9. The cells are positioned at the edges of belt 74 (FIG. 12), at points several meters before the belt passes over the drum 75, so that the cells can detect and suitably correct the side displacement of belt 74.

For further safety, a pair of mechanical sensing or feeling devices 82, 82' is placed near the photoelectric cells 81 and 81', but two cm. outside the mean position of the edge of belt 74. They stop the belt 74 immediately when its displacement reaches two cm.

Figure 8:
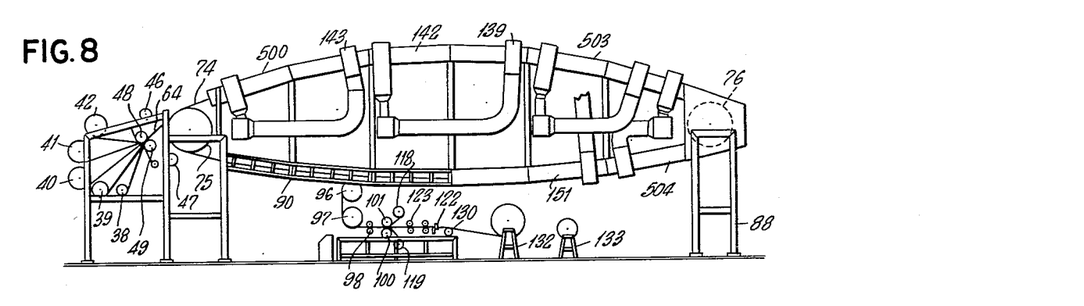
FIG. 8 is a schematic view in side elevation of an assembled machine, a few minor parts being omitted to avoid unnecessarily complicating this figure.
Figure 10:
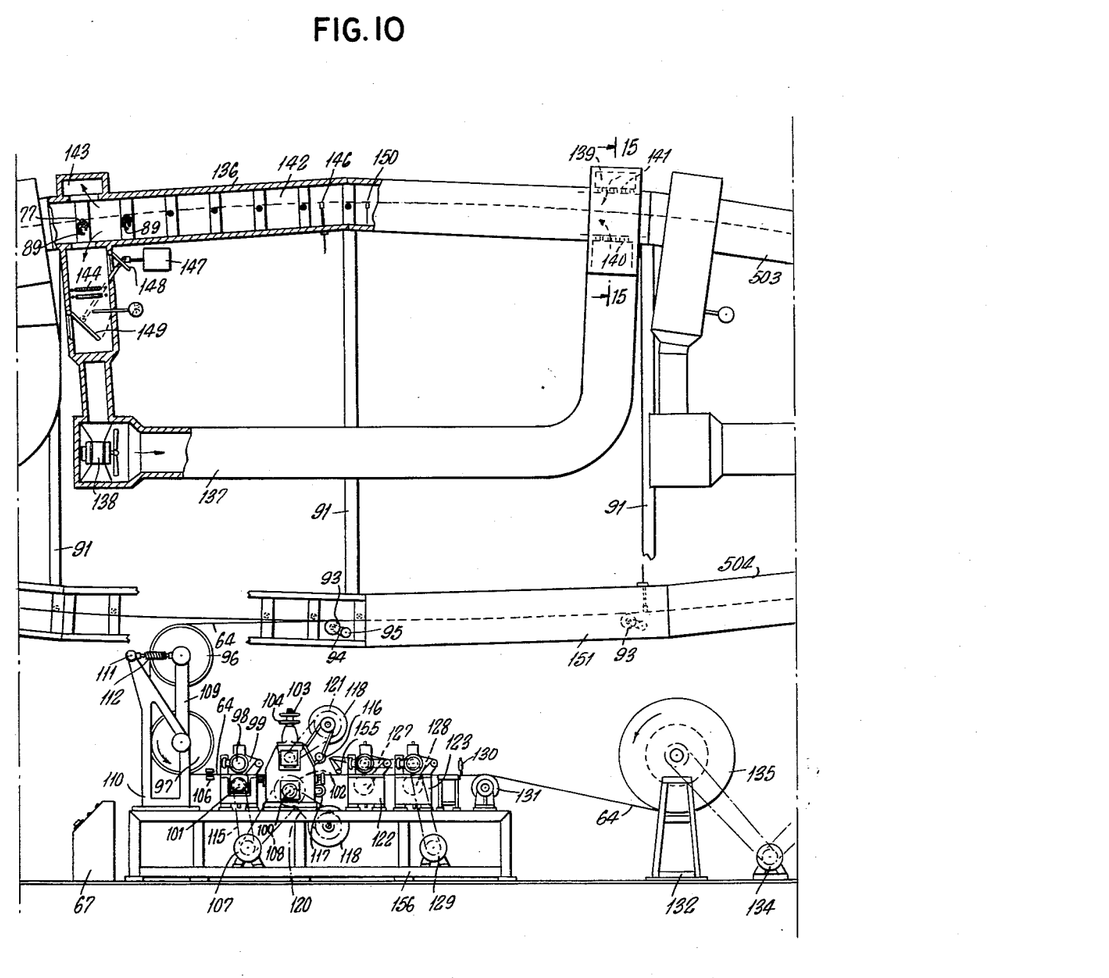

As stated above, FIGS. 9, 10 and 11 are views of the left, middle, and right regions of the machine of FIG. 8.

Figure 13:
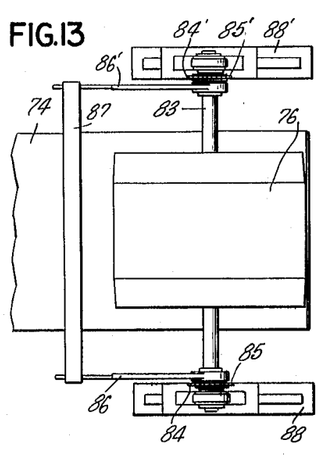

The right drum 76, on the contrary, is idle on shaft 83 (FIGS. 11 and 13). The device consisting of sprocket wheels 84, chains 85, 85', arms 86, 86' and counterweight 87 tensions belt 74. In fact, the lowering of counterweight 87 (FIG. 13) causes a rotation of the sprocket wheels 84, 84' to which it is fixed, but this causes the winding up of a portion of chains 85, 85', one end of which is fixed to the framework and the other end to the sprocket wheels 84, 84'. As a consequence the axis of drum 76 is compelled to move towards the fixed point of chains 85, 85', which is positioned outside.

According to the usual technique employed for movement of endless metal belts, drums 75, 76 have a central cylindrical band, two slightly conical ends, and a height about 20 cm. below that of belt 74. Drum 75 is journalled by framework 44, 44' while drum 76 is supported by framework 88, 88', both frameworks being rigidly and independently fixed to the ground, according to the scheme of FIG. 8.

The transverse supports 77 (FIG. 9) of belt 74 each comprise a cylindrical brass bar having a length equal to that of drums 75, 76, and each is supported by an upwardly-downwardly extending cross member 89 (FIG. 10) which permits the precise regulation of the position of supports 77.

The supports 77 are placed at a very short distance apart, about 40–45 cm. from each other, so that the pressure of belt 74 on them is very low, and the run of the belt is, as far as possible, along an arc.

The bars 89 are supported by a metal framework 90 (FIG. 9) which contains almost completely the upper and lower arcs of belt 74 and supports also the insulation, as will be described below.

The two structures, supporting the upper and the lower arcs, are united by vertical rods 91, in order to form a single truss of which said structures represent the stretched and the compressed part respectively.

In this way, framework 90 need be supported only at its ends. More precisely, it is supported by framework 44 in a rigid fashion, and by right framework 88 in a way (not shown in FIG. 11) which permits sliding, to allow for thermal expansion. With this arrangement the space beneath belt 74 can be used for the drawing, winding and control devices described below.

Adjacent the returning portion of belt 74, near left drum 75 (FIG. 9), a scraper 92 is placed to remove foreign matter which may have fallen onto the back of belt 74, to prevent its being taken between the belt and the drum.

Under the belt 74, in the portion of the lower arc which is still followed by the laminate, there are placed a number of small rollers 93. Rollers 93 are mounted on arms 94 (FIG. 10), which are pivoted at 95 and are pulled against belt 74 by springs (not shown). The small rollers 93 serve to support the lower part of the already cured laminate 64, in case the tension which makes it adhere or cling to belt 74 should fail.

Figure 14:
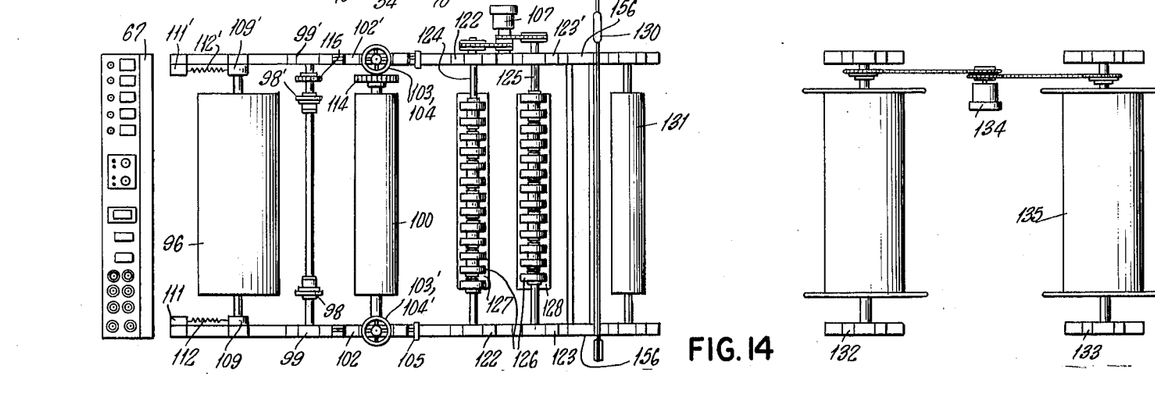
FIG. 14 is a plan view of the finishing assembly of the laminating machine of FIG. 8.
Figure 15:
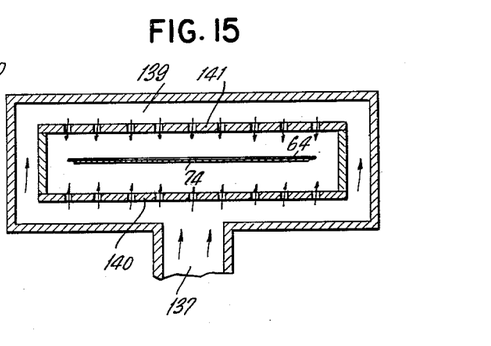
FIG. 15 is a transverse section corresponding to line 15—15 of FIG. 10.

The laminate 64 leaves the lower arc at its lowest point and is wound up on idle rolls 96 and 97 (see FIGS. 8, 10 and 14). These rolls are arranged so that an operator positioned in front of the rolls can see and inspect the outside face, that is, the decorative face, of laminate 64 and refer to the graduated tape 71. In order that the same operator may easily control the general behaviour of the machine, the control panel 67 is placed under the rolls 96 and 97.

The laminate 67 passes then between pairs of circular knives 98, 98' (FIGS. 8, 10 and 14) which cut the laminate lengthwise along the edges. The knives are mounted on shoulders 99, 99', which permits regulation either of the distance between the knives of each pair or of the position of the two in respect to the machine axis even when the machine is running. In this way the cutting can be adapted to the height and the position of the laminate, even when the machine is running.

The trimmed laminate passes successively between the two driven rollers 100, 101 (FIG. 8), supported by shoulders 102, 102' (FIG. 14). While the position of the lower roller 100 is fixed, the position and the pressure of the upper roller 101 against roller 100 can be regulated by means of double handwheels 103, 104, 103' and 104' (FIG. 14).

The shoulder 102 can be moved longitudinally by means of the screw 105 (FIG. 14), which acts on shoulder 99 of the shear, in order to regulate the transverse position of the running laminate.

This operation can be made automatic by applying to shoulder 102 the action of a servomotor similar to that at 80 (FIG. 9). In this case the pilot cell is placed in position 106. The roller 100 (FIG. 8) is controlled by a direct current speed reducer 107 (FIGS. 10 and 14) through chain transmission 108. The speed of motor 107 is a function of the desired tension of the laminate 64. On purpose it is made to depend on the position of roller 96 (FIG. 8) which is carried by oscillating arms 109, 109' (FIGS. 10 and 14), pivoted in frame 110, 110' and pushed toward the fixed points 111, 111' by the springs 112, 112'. The tension of the latter can be regulated as desired, in a known way (not shown in the drawings), to determine the tension of the laminate 64. This arrangement therefore makes it possible, by regulating the speed of the motor 66 (FIG. 9), to vary the speed of the laminate 64 as desired, thus keeping its tension constant, or its tension may be varied keeping its speed constant.

Roller 101 is controlled by roller 100 through two gears 114, only one of which is shown in FIG. 14.

Motor 107 also actuates, through chain transmission 115, the two transversely spaced shears 98, 98' whose knives therefore have a peripheral speed constantly correlated with that of the advancing laminate.

From the laminate which leaves the moving rollers 100, 101, the two cellophane sheets are stripped. The cellophane sheets then pass over the fixed rollers 116 and 117 and are wound respectively on bobbins 118, 119 (FIG. 10). These bobbins are actuated, through a clutch of a type commonly used for sheet winding operations (not shown in the drawings), by chain transmission 120 and 121. The latter are actuated by roller 100 and therefore by motor 107. A wetting device (not shown) is applied in the stripping zone of the cellophane to facilitate this operation.

The reverse of the laminate, i.e. the face normally formed by kraft paper, is then subjected to moderate or slight grinding in order to facilitate the sticking operation of the laminate, when it is to be later employed. This grinding is carried out by two groups, each consisting of a shaft 124 or 125 (FIG. 14) carrying a series of grinding elements 126. Those mounted on the shaft 125 are opposite the spaces between the elements carried by shaft 124, but with a slight superimposition in path.

Each element 126 consists of a series of radial emery cloth blades of a commercially known type. Each grinding group acts on the laminate while the latter is supported by a roller 127 or 128 which is ground and chromium plated to avoid scoring on the decorative surface of the laminate. Brackets 122, 123 (FIG. 10) support respective rollers 127, 128.

Shafts 124 and 125 are actuated by the induction three-phase motor 129 by means of a V belt transmission. The feeling device 155 (FIG. 10) stops the motor 129 when the laminate 64 is missing or stands still under no tension, in order to avoid the scoring of rollers 127, 128 or an excessive waste of a strip of the laminate.

For the sake of simplicity the suction apparatus for the dust produced by the grinding machines, which is collected by a hood placed above, is not shown in FIG. 10.

After grinding, the laminate 64 passes under the hand-operated shear 130, by which the laminate can be cut transversely when desired. The laminate 64 then passes over idle roller 131 and thereafter moves to the winding apparatus. The machine is provided with two completely similar winding groups 132, 133 (FIGS. 8, 10 and 14), actuated by a single direct current, constant torque speed reducer 134 (FIG. 10) which is substituted for the clutch coupling normally used for winding devices. The laminate 64 is wound up under constant tension on bobbin 135, conveniently consisting of a light wooden cage or of any other cheap construction which is delivered with the laminate as a package, while in the other winding group a bobbin filled with the laminate is removed and replaced by another empty bobbin.

It may be desired that the decorative face of the laminate, i.e. that to be viewed, be that which is not in contact with belt 74, for example with impregnated paper rolls having an arrangement reverse to that previously described. In such case it will be sufficient to orient, in the opposite direction, the framework 156, 156' which carries the drawing group, the shears, the grinding devices and the winding groups 132 and 133. Care should be taken that the orientation of the support of rollers 96, 97 remains unchanged.

During its passage on belt 74 the laminate 64 must undergo the polymerization process by heat. It has been found that the useful run of tape belt 74 should be divided into five zones, the first four zones of which are heating zones and the last a cooling zone. Each heating zone consists of a portion of the supporting framework 90 which is enclosed in a suitable insulation 136, and a channel 137 (FIGS. 10 and 15) which forms or provides a closed circuit with said portion. In FIG. 10 the details of the heating system are shown only for the second heating zone 142, but they are the same for the other zones.

The electric fan 138 (FIG. 10) blows the air into duct 137 and from there into chamber 139. From the latter the air passes through the gratings 140, 141 into the chamber 142, in countercurrent with belt 74 and laminate 64, as they pass through said chamber 142.

The chamber 139 and the gratings 140, 141 enable the air to enter the second zone or chamber 142 at a practically uniform rate at any point of each transverse section, which is necessary to obtain a laminate of good uniformity.

From chamber 142 the air passes into a collecting chamber 143 through the heating elements 144 and returns to the fan.

The thermometer 145 regulates the amount of heat supplied to the heating elements 144 in order to keep the temperature in the chamber 142 constant. The heating may be by steam, electric current, or other means.

The polymerization reaction is exothermic and, if for any reason, it occurs in too short a time, it causes a temperature increase which can irreparably damage the appearance and sometimes even the mechanical resistance or strength of the laminates. It is therefore necessary to intervene as quickly as possible to repress the overheating. For this purpose, in each heating zone there is provided a thermocouple 146 (FIG. 10) on which the metal belt 74 glides. This thermocouple can sense an increase of temperature of the laminate more quickly than a thermometer placed in the air. The thermocouple actuates a servomotor 147 which, in turn, opens the air lock 148 which discharges, to the atmosphere, the warm air coming from the chamber 142, and operates air lock 149 to close the passage of the warm air to the fan 138 and open the passage for the cold air. In this way the cold air is substituted wholly or in part for the warm air in a very short time and with a minimum of effort or inertia, until the temperature of belt 74, determined by thermocouple 146, is normal. Another thermocouple 150 acts on a suitable recorder connected with the control panel 67 (FIG. 14), so that the same operator can easily control the thermal behaviour of the machine. Of the four heating zones, the first zone 500 is kept at about 80° C. and serves the function of preheating, while the second zone 142 and third zone 503 are the real polymerization zones and are kept at 85–90° C. In the latter two zones the thermal control must be close. The fourth zone, at 504, is the post-curing zone and is maintained at 100° C.

The fifth zone, the cooling zone 151, is, on the contrary, operated in open circuit. In this zone the fan 152 (FIG. 11) draws in room air and ejects it through the stack 153 after having passed in countercurrent through the chamber 151.

The purpose of the cooling is to carry the metal belt 74 back to the starting of the process sufficiently cold, and to strip the cellophane from the laminate when this is also sufficiently cold. Otherwise a loss of brilliancy of the laminate would occur.

The contact pressure perpendicular to the arcuate portion of the belt is preferably about 20–40 grams per square centimeter.

In the impregnation step a low viscosity polyester resin of the following formulation was used, at about 20° C.:

31% propylene glycol
    12.2% maleic anhydride
    27.5% phthalic anhydride
    32.2% styrene monomer For the adhering together of the various sheets with high viscosity polyester resin, the following formulation was used:

35% maleic anhydride
    41% diethylene glycol
    30% diallyl phthalate The amount higher than 100% is water, which is derived from the reaction and is eliminated by distillation.

In the machine and the process described, in addition to or in place of the above-mentioned papers there may be used other types of paper, either cellulosic or of other nature. Moreover, fabrics, mats such as glass fibre mats, and the like, can be employed. Polyester resins of various formulations and also other compounds which are polymerizable without pressure, such as methacrylic resins, can be employed. Each or all of them can be used with various types of catalysts to obtain curing at different temperatures. In the various cases enumerated, different products are obtained, differing not only decoratively but functionally for different technical purposes.

It is understood that further modifications obvious to persons skilled in the art can be made in the apparatus within the scope of the present invention.

We claim:

1. An apparatus for continuous production of a flat flexible laminate from a sheet impregnated with a resin-forming polymerizable material, said apparatus comprising a polymerization vessel, an endless moving metal heat-conductive carrier belt having two opposite outwardly arched curved convex surfaces in said vessel, both convex surfaces having the arcs of their arches extending lengthwise of the belt in the direction of movement of the belt, means for feeding a plurality of said impregnated sheets onto the moving belt and for applying tension to the sheets to cause the sheets to press toward the convex surfaces, the belt carrying the continuous sheets against one of its convex surfaces and then against the other, means for moving the belt and the sheets at substantially the same linear speed in the same direction, including two rollers supporting the belt at opposite ends thereof, one being power driven, the other turning idle, support means between the rollers, along both convex surfaces, to establish a substantially oval configuration for the run of the belt between the rollers.

2. An apparatus for continuous production of a flat flexible laminate from a continuous sheet impregnated with a resin-forming polymerizable material, said apparatus comprising a polymerization vessel, an endless moving metal carrier belt having two opposite outwardly arched curved convex surfaces in said vessel, both convex surfaces having the arcs of their arches extending lengthwise of the belt in the direction of movement of the belt, means for feeding a plurality of said continuous impregnated sheets onto the moving belt and for applying tension to the sheets to cause the sheets to press toward the convex surfaces, the belt carrying the continuous sheets against one of its convex surfaces and then against the other, means for moving the belt and the sheets at substantially the same linear speed in the same direction, two rollers supporting the belt at opposite ends thereof, one being power driven, the other turning idle, support means between the rollers, along both convex surfaces, to establish a substantially oval configuration for the run of the belt between the rollers at least, a portion of said convex surfaces having heat-insulated longitudinal enclosure means and providing a plurality of zones for respective preheating, polymerization and post-polymerization curing, means for circulating temperature controlling and maintaining gas in said zones, the later means being independently controllable for each zone and being provided with devices for speedy removal of overheat caused by heat of polymerization, and a cooling zone adjacent one of said convex surfaces, to which cooling zone the sheets pass after leaving the post-polymerization zone.

3. An apparatus for continuous production of a flat flexible laminate from a continuous sheet impregnated with a resin-forming polymerizable material, said apparatus comprising a polymerization vessel, and endless movable metal carrier belt having two opposite outwardly arched convex surfaces in said vessel, the arcs of the arches extending longitudinally of the carrier belt, in the direction of movement of the belt, means for feeding, onto the belt, a sandwich comprising a plurality of said impregnated continuous sheets disposed between two outer flexible covering sheets, including combining roller means for determining the thickness of the laminate, the belt carrying the sandwich against one of its convex surfaces and then against the other, means for moving the belt and the sheets at substantially the same linear speed in the same direction, two rollers supporting the belt at opposite ends thereof, one being power driven, the other turning idle, support means between the rollers, along both convex surfaces, to establish a substantially oval configuration for the run of the belt between the rollers, means for withdrawing the resulting laminate from the belt and for keeping the laminate under tension to cause the sheets to press toward the convex surfaces, means for lateral trimming of the edges of the laminate, and for transverse cutting thereof.

4. An apparatus for continuous production of a flat flexible laminate from a continuous sheet impregnated with a resin-forming polymerizable material, said apparatus comprising a polymerization vessel, an endless moving metal carrier belt having two opposite outwardly arched curved convex surfaces in said vessel, both convex surfaces having the arcs of their arches extending longitudinally in the direction of movement of the belt, means for feeding a plurality of said continuous impregnated sheets onto the moving belt and for the applying tension to the sheets to cause the sheets to press toward the convex surfaces, the belt carrying the continuous sheets against one of said convex surfaces and then against the other, means for moving the belt and the sheets at substantially the same linear speed in the same direction, means rotatably supporting the belt at opposite ends thereof, support means along both convex surfaces to establish the curvature of said convex surfaces, heat-insulated longitudinal enclosure means along at least one of the convex surfaces providing a plurality of zones for respective preheating, polymerization and post-polymerization curing, means for circulating gas in said zones to control the temperature therein, the latter means being independently controllable for each zone and being provided with devices for speedy removal of overheat caused by heat of polymerization, and a cooling zone along one of said convex surfaces through which the sheets pass after leaving the post-polymerization zone.

5. An apparatus for continuous production of a flat laminate from a sheet impregnated with a resin-forming polymerizable material, said apparatus comprising a heated polymerization vessel, a rotary endless elongated metal belt having a convex surface in said vessel, the convex surface having the arc of its arch extending lengthwise of the belt in the direction of movement thereof, means for introducing a sandwich into said vessel and against said convex surface, the sandwich comprising said impregnated sheet disposed between two flexible, heat-resistant backing sheets which prevent escape of the resin, means for moving said sandwich and said rotary belt in the same direction and at the same linear speed, and means for applying tensioning force to the flexible sheets of said sandwich, the force having a component perpendicular to and directed toward the convex surface, means subdividing said vessel into a plurality of treating sections through which the convex surface of the belt extends, and means for circulating gas into at least one of said sections for passage at opposite sides of said belt and sandwich, for temperature control of said section.

6. An apparatus for production of a laminate from a sheet impregnated with a resin-forming polymerizable material, said apparatus comprising a polymerization vessel, a rotary endless elongated metal belt having a convex surface in said vessel, the convex surface having the arc of its arch extending lengthwise of the belt in the direction of movement thereof, a second endless moving belt in said vessel, the second belt being flexible and being maintained under tensile force and having a concave surface juxtaposed to the said convex surface, means for feeding said impregnated sheet between said convex and concave surfaces, and means for moving the concave and convex portions of said belts, and said impregnated sheet, in the same direction and at the same linear speed, the said tensile force having a component perpendicular to and directed toward the convex surface, whereby the polymerization takes place under contact pressure applied by the said second belt, means subdividing said vessel lengthwise thereof, and of the convex surface of the belt, into a plurality of sections, and means for circulating gas into at least one of said sections for temperature control of said section, said means for circulating comprising gas intake and gas outlet ducts mutually spaced lengthwise of said belts.

7. An apparatus for continuous production of a flat flexible laminate from a sheet impregnated with a resin-forming polymerizable material, said apparatus comprising a polymerization vessel, an endless moving elongated metal heat-conductive belt having two opposite elongated curved convex surfaces in said vessel, both convex surfaces having the arcs of their arches disposed lengthwise of the belt, in the direction of movement of the belt, means for feeding said impregnated sheet against both of said convex surfaces, means for moving said belt and said impregnated sheet at the same linear speed and in the same direction in said vessel and for applying force to said sheet, to cause the sheet to press toward the convex surfaces.

8. An apparatus for producing a flat laminate from a sheet impregnated with a resin-forming polymerizable material, said apparatus comprising a polymerization vessel, a rotary endless, elongated metal belt having a curved convex surface, the convex surface having the arc of its arch extending lengthwise of the belt, in the direction of movement of the belt, means for introducing a plurality of said impregnated sheets into said vessel and against said convex surface, and a second belt for moving said sheets and the convex surface of the first belt in the same direction, the second belt having a concave surface for applying pressing force to said sheets, the force having a component perpendicular to and directed toward the convex surface, means for dividing the polymerization vessel into sections, including a pre-treatment section, a polymerization section and a section for after-curing, the convex surface portion of the first rotary belt and the sandwich being mounted to move through the said sections, and means for circulating gas into at least one of said sections for passage at opposite sides of said sandwich, for temperature control of said section.

9. An apparatus for continuous production of a laminate from a sheet impregnated with a resin-forming polymerizable material, said apparatus comprising a polymerization vessel, an endless, flexible, moving metal belt having a curved convex surface in said vessel, a second endless, flexible, moving belt, means for maintaining the latter under tensile force, the second belt having a concave surface juxtaposed to the convex surface, the arcs of the convex and concave surfaces extending in the direction of movement of the belts, means for feeding a sandwich into said vessel and between the concave and convex surfaces, the sandwich comprising said impregnated sheet disposed between two flexibility-retaining backing sheets which prevent escape of the resin, and means for moving said sandwich and said belts in the same direction and at the same linear speed and for applying tensioning force to the flexible sheets of said sandwich, the tensioning force and the tensile force each having a component perpendicular to and directed toward the convex surface.

10. An apparatus for production of a laminate from a sheet impregnated with a resin-forming polymerizable material, said apparatus comprising a polymerization vessel, a rotary endless elongated metallic, heat-conducting belt having a convex surface in said vessel, the convex surface having the arc of its arch extending lengthwise of the belt in the direction of movement thereof, a second moving, flexible belt, tension means for maintaining the second belt under tensile force, the second belt having a concave surface juxtaposed to and forced toward the said convex surface by said tension means, means for feeding said impregnated sheet between said convex and concave surfaces, and means for moving the concave and convex portions of said belts, and said impregnated sheet, in the same direction and at the same linear speed, means subdividing said vessel lengthwise of the convex surface of the belt into a plurality of sections, said sections including a polymerization zone and a subsequent curing zone, and means for control of the temperatures in said zones.

11. An apparatus for continuous production of a flat laminate from a sheet impregnated with a resin-forming polymerizable material, said apparatus comprising a polymerization vessel having means for control of the temperature therein, an endless moving elongated metal heat-conductive belt having a curved convex surface in said vessel, said convex surface having the arc of its arch disposed lengthwise of the belt, the arc extending in the direction of movement of the belt, rollers rotatably supporting the belt at opposite ends thereof, support means between the rollers to establish the curved convex configuration of the belt between the rollers, means for feeding said impregnated sheet to said convex surface, means for moving said belt and said impregnated sheet at the same linear speed and in the same direction in said vessel and for applying force to said sheet, to cause the sheet to press toward the convex surface, and means to wind the sheet into roll form after said polymerization.

12. An apparatus for continuous production of a flat flexible laminate from a sheet impregnated with a resin-forming polymerizable material, said apparatus comprising a polymerization vessel, an endless moving elongated heat-conductive metal belt having a curved convex surface in said vessel, said convex surface having the arc of its arch disposed lengthwise of the belt, the arc extending in the direction of movement of the belt, rollers rotatably supporting the belt at opposite ends thereof, support means between the rollers to establish the curved convex configuration of the belt between the rollers, means for applying force to said sheet, to cause the sheet to press toward the convex surface, said force-applying means comprising an outer sheet of resin retentive material and means for tensioning said sheet, means for moving the belt, the impregnated sheet, and outer sheet, at the same linear speed and in the same direction in said vessel.

13. The apparatus defined in claim 12, the said vessel being subdivided lengthwise of the convex surface of the belt into a plurality of sections, said sections including a polymerization zone and a subsequent curing zone, and means for control of temperatures in said zones.

References Cited in the file of this patent

UNITED STATES PATENTS

| | | |
|---|---|---|
| 2,434,541 | Bierer | Jan. 13, 1948 |
| 2,442,443 | Swallow | June 1, 1948 |
| 2,486,091 | Adams et al. | Oct. 25, 1949 |
| 2,528,152 | Landgraf | Oct. 31, 1950 |
| 2,675,053 | Clemens | Apr. 13, 1954 |
| 2,782,458 | Emmert et al. | Feb. 26, 1957 |
| 2,784,763 | Shorts | Mar. 12, 1957 |

OTHER REFERENCES

"Tailor-Made Polyester Resin," Modern Plastics (October 1957); pages 111–115 relied upon; 154–Alkyd Dig.